United States Patent
Lloyd

(10) Patent No.: US 7,156,382 B2
(45) Date of Patent: Jan. 2, 2007

(54) DUAL AIRBAG AIRSPRING

(75) Inventor: Jeffrey Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/772,524

(22) Filed: Feb. 5, 2004

(65) Prior Publication Data

US 2005/0173851 A1 Aug. 11, 2005

(51) Int. Cl.
*F16F 9/43* (2006.01)
(52) U.S. Cl. .......... 267/64.28; 267/31; 267/64.27; 267/122
(58) Field of Classification Search ........ 267/201, 267/219, 31, 35, 64.19, 64.21, 64.23, 64.24, 267/64.25, 64.26, 64.27, 64.28, 122
See application file for complete search history.

(56) References Cited

U.S. PATENT DOCUMENTS

| | | | |
|---|---|---|---|
| 2,960,333 A * | 11/1960 | McGavern, Jr. et al. . | 267/64.24 |
| 3,010,715 A * | 11/1961 | Bordenkircher et al. . | 267/64.24 |
| 4,325,541 A * | 4/1982 | Korosladanyi et al. ..... | 267/220 |
| 4,502,673 A * | 3/1985 | Clark ...................... | 267/64.24 |
| 4,564,177 A | 1/1986 | Leonard | |
| 4,741,517 A * | 5/1988 | Warmuth et al. ........ | 267/64.24 |
| 4,770,095 A * | 9/1988 | Schofield .................... | 100/170 |
| 4,877,223 A * | 10/1989 | Hackett ................... | 267/64.17 |
| 5,382,006 A | 1/1995 | Arnold | |
| 5,671,907 A | 9/1997 | Arnold | |
| 5,954,316 A | 9/1999 | Voss | |
| 6,386,523 B1 | 5/2002 | Crabtree et al. | |
| 6,386,525 B1* | 5/2002 | Stuart ...................... | 267/64.27 |
| 6,431,529 B1 | 8/2002 | Maeda | |
| 6,536,749 B1* | 3/2003 | Luhmann et al. ........ | 267/64.19 |
| 6,604,734 B1* | 8/2003 | Griffiths .................. | 267/64.14 |
| 2003/0173723 A1* | 9/2003 | Behmenburg et al. ...... | 267/122 |

FOREIGN PATENT DOCUMENTS

| | | | |
|---|---|---|---|
| DE | 10009212 | * | 9/2001 |
| EP | 1429045 | * | 12/2002 |
| JP | 2004156663 | * | 6/2004 |

* cited by examiner

*Primary Examiner*—Devon Kramer
(74) *Attorney, Agent, or Firm*—Carlson, Gaskey & Olds

(57) ABSTRACT

An air spring assembly includes a primary airbag mounted to a piston air bag such that the piston airbag provides a rolling surface for the primary airbag. A change in the piston airbag pressure changes the effective rate of the primary air spring. A relatively small change in the piston airbag volume provides a change in the spring rate of air spring assembly as the diameter of the rolloff surface is selectively modified.

29 Claims, 2 Drawing Sheets

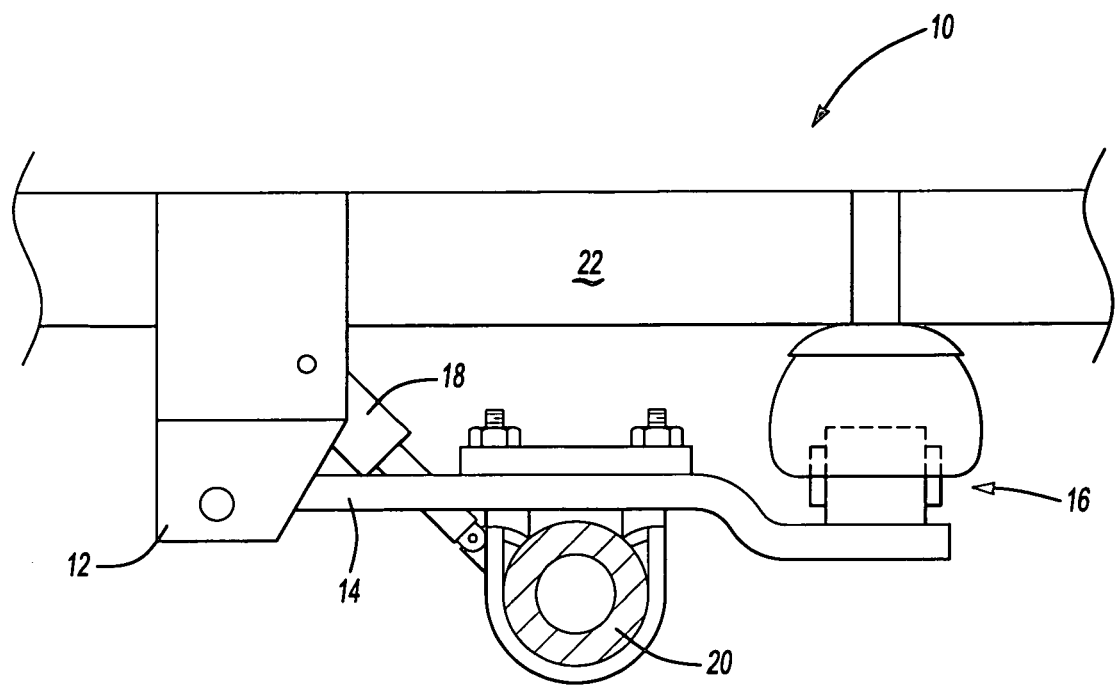
Fig-1
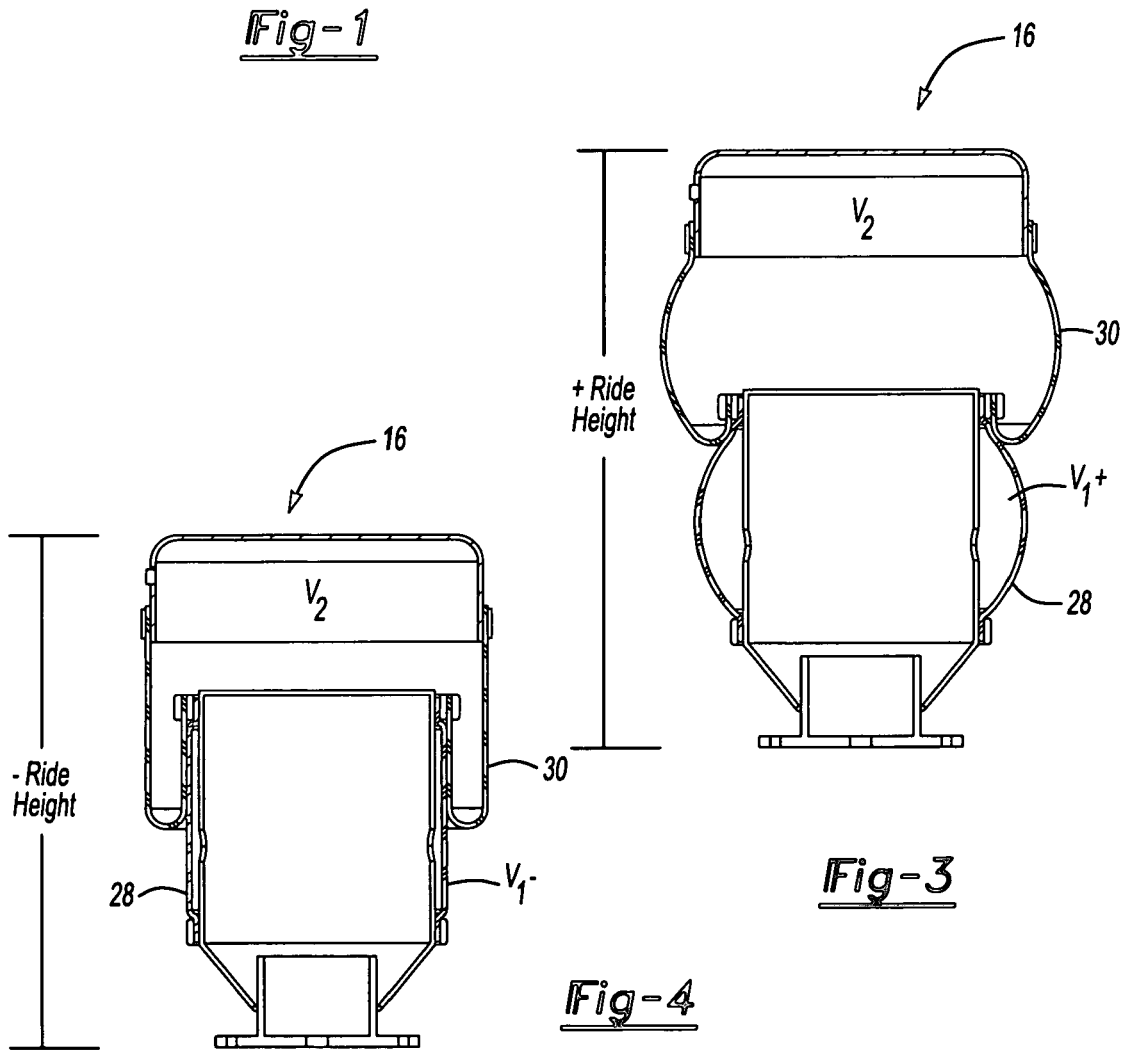
Fig-3
Fig-4

DUAL AIRBAG AIRSPRING

BACKGROUND OF THE INVENTION

The present invention relates to an air spring, and more particularly to an air spring with an inner airbag as a roll off piston.

Air spring assemblies are utilized for a variety of applications. One such application is to cushion the ride of a vehicle. An air spring assembly generally includes a flexible member attached to a piston. The piston advances or retreats into the interior of the flexible member, which changes the internal volume of the assembly. The spring rate depends on the change of internal volume and the effective area of the piston. In addition, the amount of air delivered to the interior of the flexible member is adjustable to vary the preload or ride height.

To vary the spring rate of a conventional air spring, auxiliary air tanks are selectively connected to the flexible member to change the effective volume of the air spring. Disadvantageously, the auxiliary air tanks may present packaging difficulties and are limited by the cross-sectional area of the flow path between the air spring and the auxiliary air tank. Such an arrangement limits the air spring to a two-stage spring rate in which either the auxiliary air tank is connected or disconnected.

Accordingly, it is desirable to provide an air spring assembly, which achieves variable spring rates without auxiliary air tanks.

SUMMARY OF THE INVENTION

The air spring assembly according to the present invention provides a primary airbag mounted around a piston airbag such that the piston airbag provides a rolling surface for the primary airbag. A change in the piston airbag volume changes the effective piston area of the primary airbag. A relatively small change in the effective piston area provides a change in the spring rate of an air spring assembly. By selectively controlling the pressure within the volumes, infinite variation in spring rates are possible without an auxiliary tank and associated actuators. The relatively smaller volume of the piston airbag relative to the primary airbag permits rapid pressure and volume changes to enable active suspension control.

The present invention therefore provides an air spring assembly which achieves variable spring rates without auxiliary air tanks.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general side view of an exemplary vehicle suspension system embodiment for use with the present invention;

FIG. 3 is a sectional view of an air spring assembly in a first position; and

FIG. 4 is a sectional view of an air spring assembly in a second position.

DETAILED DESCRIPTION OF THE PREFERRED EMBODIMENT

Figure 2:
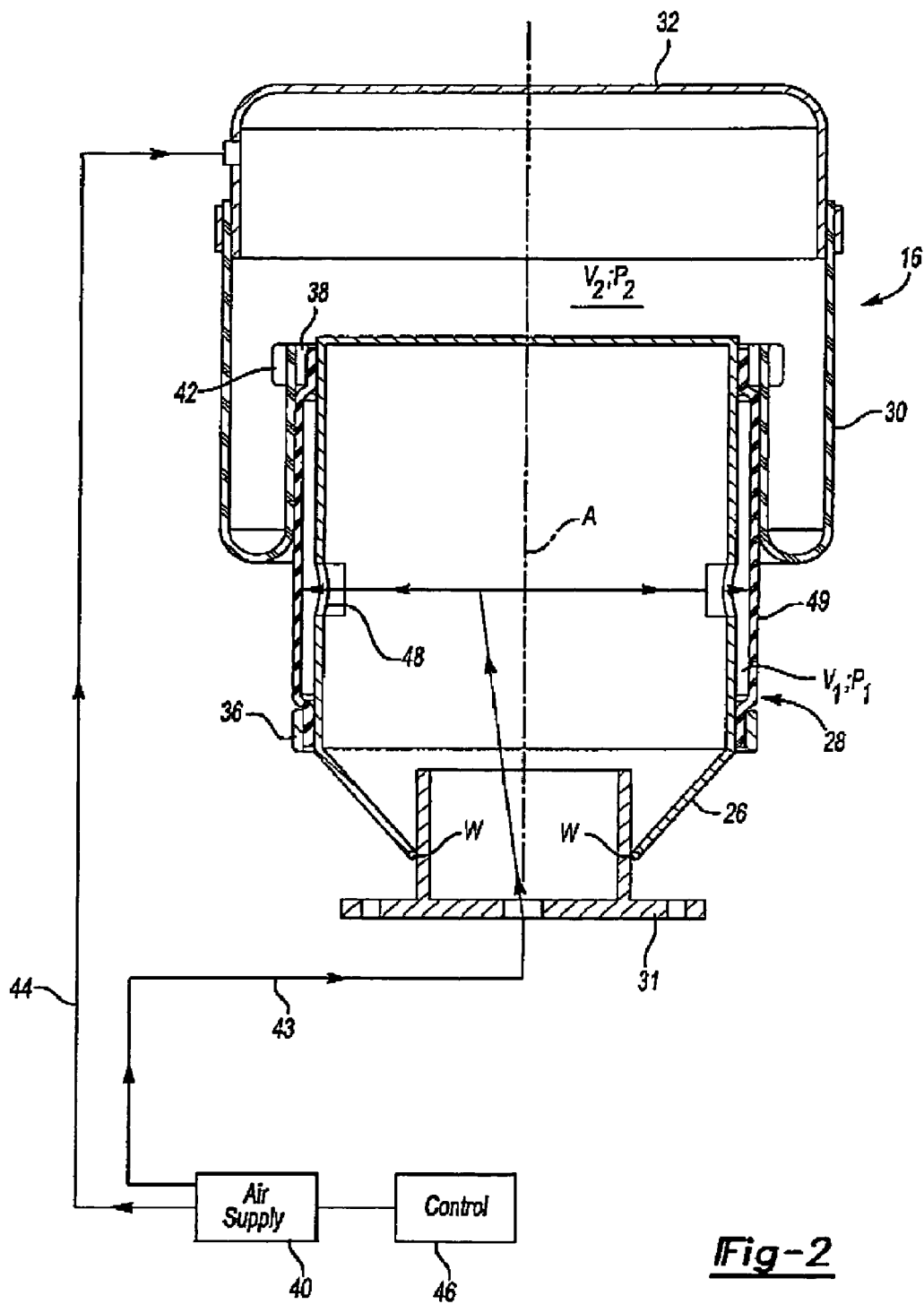
FIG. 2 is a sectional view of an air spring assembly designed according to the present invention.

FIG. 1 illustrates an air suspension system 10 for a vehicle. The system 10 generally includes a bracket 12, a longitudinal member 14, an air spring assembly 16, a damper 18 and an axle assembly 20. The system is fixed to a chassis of the vehicle (shown schematically at 22). It should be understood that although a particular component arrangement is disclosed in the illustrated embodiment, other arrangements will benefit from the instant invention.

Referring to FIG. 2, the air spring assembly 16 is illustrated in cross-section. The air spring assembly 16 is defined along an axis A and includes a outer piston 26, a piston airbag 28 and a primary airbag 30. An upper mount 32 attached to the primary airbag 30 and a lower mount 31 (illustrated schematically) preferably provide attachment for the air spring assembly 16.

The outer piston 26 is preferably a cylindrical member defined about the axis A. The outer piston 26 is preferably attached to the lower mount 31 at welds W or the like. The outer piston 26 and the lower mount 31 are relatively rigid components. It should be appreciated that other mount arrangements such as struts and the like will also benefit from the present invention.

The piston airbag 28 is a resilient member and attached to the outer piston 26 through a first band 36 and a second band 38. It should be understood that other attachments will likewise benefit from the present invention. The piston airbag 28 defines a first volume V1 between the bands 36, 38 and a piston airbag outer surface 49 and outer piston 26.

The primary airbag 30 is mounted to the piston air bag 28 through a third band 42 which is directly adjacent the second band 38. That is, the third band 42 and the second band 38 sandwiches the primary airbag 30 therebetween. The primary airbag 30 defines a second volume V2. It should be understood that although two volumes are disclosed in the illustrated embodiment any number of volumes will benefit from the present invention. Moreover, the volumes may be selectively segmented to provide further incremental volume changes.

An air supply 40 (illustrated schematically) communicates air independently into the volumes V1, V2 through a first and a second supply conduit 43, 44 respectively in response to a controller 46. The controller 46 is preferably a suspension controller which provides active suspension control methodology. Ports 48 through the outer piston 26 supply air into the first volume V1. It should be understood that various air supplies will benefit from the present invention and that any air supply system which independently provides air pressure into the volumes V1, V2 will benefit from the present invention.

The piston airbag 28 operates as a rolloff piston surface for the primary airbag 30. That is, the primary airbag provides a rolling lobe over a piston of a variable diameter. That is, the primary airbag rolls along the outer surface 49 of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter 49 until an equilibrium diameter is reached. Therefore a change in pressure P1 will change the radial spring rate of the piston airbag 28 and change the equilibrium diameter also effecting the primary airbag 28 spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the air spring assembly 16 as volume V1 effectively provides a larger rolloff piston. The opposite results are obtained when the pressure within the piston airbag 28 is reduced as volume V1 respectively decreases (FIG. 4).

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air spring assembly comprising:
   a piston support;
   a piston airbag formed of a flexible material and mounted to said piston support to define a first variable volume chamber; and
   a primary airbag formed of a flexible material to define a second variable volume chamber, said first variable volume chamber being pneumatically isolated from said second variable volume chamber, and wherein at least a portion of said primary airbag is mounted in contact with an outer surface of said piston airbag such that a change in volume of said first variable volume chamber operates to change a spring rate of said primary airbag in response thereto; and
   an air supply to direct air independently into said first variable volume chamber and said second variable volume chamber.

2. The air spring assembly as recited in claim 1, wherein an increased volume of air is directed into said piston airbag to change a diameter of said piston airbag and change a spring rate of said primary airbag.

3. The air spring assembly as recited in claim 1, wherein an increase in pressure within said first variable volume chamber increases a spring rate of said primary airbag.

4. The air spring assembly as recited in claim 1, wherein a decrease in pressure within said first variable volume chamber decreases a spring rate of said primary airbag.

5. The air spring assembly as recited in claim 1, further comprising a first band and a second band that retain said piston airbag to said piston.

6. The air spring assembly as recited in claim 5, further comprising a third band which retains said primary airbag to said piston airbag.

7. The air spring assembly as recited in claim 6, wherein said third band retains said primary airbag to said second band.

8. The air spring assembly as recited in claim 1, wherein said primary airbag is located to roll along said outer surface of said piston airbag.

9. The air spring assembly as recited in claim 1, said piston support having at least one port located through a radial surface defined about a longitudinal axis of said piston support to communicate an airflow into said piston airbag to change a pressure within said piston airbag.

10. The air spring assembly as recited in claim 9, wherein said at least one port comprises at least a first port in an upper mount that mounts said primary airbag and a second port in a lower mount mounted to said piston support that supports said piston airbag.

11. The air spring assembly as recited in claim 1, wherein the air supply communicates air independently into said primary airbag and said piston airbag through a respective first supply conduit and second supply conduit.

12. The air spring assembly as recited in claim 1, further comprising a lower mount attached to said piston support.

13. The air spring assembly as recited in claim 12, further comprising an upper mount attached to said primary airbag.

14. The air spring assembly as recited in claim 1, further comprising an upper mount attached to said primary airbag and a lower mount attached to said piston support.

15. An air suspension system for a vehicle having a frame member, the air suspension system comprising:
   a longitudinal member extending generally along a length of the frame member and mountable to the vehicle for pivotal movement about an axis generally transverse to the frame member;
   a primary airbag formed of a flexible material disposed between said longitudinal member and the frame member to define a first variable volume chamber; and
   a piston airbag formed of a flexible material to define a second variable volume chamber isolated from said first variable volume chamber, and wherein said piston airbag is mounted at least partially within said primary airbag such that a portion of said primary airbag contacts an outer surface of said piston airbag such that a change in volume of said piston airbag operates to change a spring rate of said primary airbag in response thereto.

16. The suspension system as recited in claim 15, further comprising an air supply which independently communicates air to said primary airbag and said piston airbag respectively through first and second ports, said first port being in an upper mount which mounts said primary airbag and said second a port being in a lower mount that is mounted to a piston support which supports said piston airbag.

17. The suspension system as recited in claim 15, wherein said primary airbag is located to roll along said outer surface of said piston airbag.

18. The suspension system as recited in claim 15, further comprising a piston support, said piston airbag mounted to said piston support, said piston support having at least one port located through a radial surface defined about a longitudinal axis of said piston support to communicate an airflow into said piston airbag to change a pressure within said piston airbag.

19. The suspension system as recited in claim 18, further comprising a lower mount attached to said piston support, said lower mount attached to said longitudinal member.

20. The suspension system as recited in claim 15, further comprising an air supply which communicates air independently into said primary airbag and said piston airbag through a respective first supply conduit and second supply conduit.

21. A method of changing a spring rate of an air spring assembly comprising the steps of:
   (1) mounting a primary airbag adjacent to and pneumatically isolated from a piston airbag such that the piston airbag is located as a rolling surface for the primary airbag, the piston airbag defining a selectively changeable first volume and the primary airbag defining a selectively changeable second volume; and
   (2) independently changing a pressure within the selectively changeable first volume independent of a pressure within the selectively changeable second volume such that a spring rate of the primary airbag changes.

22. The method as recited in claim 21, further comprising the step of:
   independently changing a volume of the selectively changeable second volume defined within the primary airbag.

23. The method as recited in claim 21, wherein said step (2) further comprises the step of:
   (a) communicating air independently into the selectively changeable first volume and the selectively changeable second volume to independently change the pressures therein.

24. The method as recited in claim 21, wherein said step (2) further comprises the step of:
   (a) independently changing a pressure within the piston airbag to change an equilibrium diameter such that the primary airbag spring rate is changed.

25. The method as recited in claim 24, wherein said step (2) further comprises the step of:
   (b) increasing the pressure within the piston airbag to increase the diameter of the piston airbag to increase a diameter of the primary airbag and provide a greater spring rate and ride height.

26. The method as recited in claim 24, wherein said step (2) further comprises the step of:
   (b) decreasing the pressure within the piston airbag to decrease the diameter of the piston airbag to decrease a diameter of the primary airbag and provide a decreased spring rate and ride height.

27. An air spring assembly comprising:
   a piston support;
   a piston airbag mounted to said piston support;
   a primary airbag mounted adjacent said piston air bag such that at least a portion of said primary airbag contacts said piston airbag;
   a first band and a second band which retain two spaced ends of said piston airbag to an outer surface of said piston support and to define a sealed chamber therebetween; and
   a third band which retains said primary airbag to said piston airbag.

28. The suspension system of claim 27, wherein said third band retains said primary airbag to said piston airbag.

29. An air suspension system for a vehicle having a frame member, the air suspension system comprising:
   a longitudinal member extending generally along a length of the frame member and mountable to the vehicle for pivotal movement about an axis generally transverse to the frame member;
   a primary airbag disposed between said longitudinal member and the frame member;
   a piston airbag mounted at least partially within said primary airbag such that a change in pressure within said piston airbag operates to change a spring rate defined by said primary airbag; and
   an air supply which independently communicates air to said primary airbag and said piston airbag.

* * * * *

UNITED STATES PATENT AND TRADEMARK OFFICE
CERTIFICATE OF CORRECTION

PATENT NO. : 7,156,382 B2
APPLICATION NO. : 10/772524
DATED : January 2, 2007
INVENTOR(S) : Jeffrey Lloyd It is certified that error appears in the above-identified patent and that said Letters Patent is hereby corrected as shown below:

Claim 16, Column 4, line 62: Delete first occurrence of "a" which is after "second"

Signed and Sealed this

Tenth Day of April, 2007

JON W. DUDAS
*Director of the United States Patent and Trademark Office*